(12) United States Patent
Wei

(10) Patent No.: US 7,698,992 B2
(45) Date of Patent: Apr. 20, 2010

(54) MULTI-FUNCTION COFFEE MAKER

(75) Inventor: Kun-Iian Wei, Zhuhai (CN)

(73) Assignee: Toptechnology Co., Ltd., Zhuhai (CN)

( * ) Notice: Subject to any disclaimer, the term of this patent is extended or adjusted under 35 U.S.C. 154(b) by 513 days.

(21) Appl. No.: 11/622,392

(22) Filed: Jan. 11, 2007

(65) Prior Publication Data

US 2007/0107604 A1 May 17, 2007

Related U.S. Application Data

(63) Continuation-in-part of application No. 10/843,179, filed on May 11, 2004, now abandoned.

(30) Foreign Application Priority Data

Jun. 5, 2003 (CN) ................................. 03 1 26801

(51) Int. Cl.
A47J 31/00 (2006.01)
(52) U.S. Cl. ............................... 99/281; 99/280; 99/295
(58) Field of Classification Search ........... 99/279–323, 99/275, 495, 348, 452–455, 467–470, 485–491
See application file for complete search history.

(56) References Cited

U.S. PATENT DOCUMENTS

| 4,054,085 | A | * | 10/1977 | Tarr .............................. 99/284 |
|---|---|---|---|---|
| 4,478,139 | A | * | 10/1984 | Zimmerman .................. 99/280 |
| 5,063,838 | A | * | 11/1991 | Matuschek .................... 99/307 |
| 5,186,096 | A | * | 2/1993 | Willi ............................ 99/282 |
| 5,211,103 | A | * | 5/1993 | Anson .......................... 99/284 |
| 5,347,811 | A | * | 9/1994 | Hasegawa et al. ............. 60/426 |
| 5,638,740 | A | * | 6/1997 | Cai .............................. 99/295 |
| 5,669,287 | A | * | 9/1997 | Jefferson et al. .............. 99/299 |
| 6,360,650 | B1 | * | 3/2002 | Mangiapane ................. 99/291 |
| 6,439,105 | B1 | * | 8/2002 | Ford ............................. 99/280 |
| 6,742,442 | B1 | * | 6/2004 | Su ............................... 99/281 |
| 6,752,069 | B1 | * | 6/2004 | Burke et al. .................. 99/280 |
| 6,766,729 | B2 | * | 7/2004 | Rolland ........................ 99/284 |

* cited by examiner

*Primary Examiner*—Timothy F. Simone
(74) *Attorney, Agent, or Firm*—Carstens & Cahoon LLP

(57) ABSTRACT

The present invention provides a multi-function coffee maker, comprising at least two brewing accessories including an espresso coffee brewing accessory and a drip coffee brewing accessory, which are interchangeable and each can be loaded within said brewing room of said cover assembly to form an individual brewing chamber. Said multi-function coffee maker further comprises a control circuit including a detection circuit for the brewing accessory. By a water distributor assembly and said control circuit, water flow of suitable pressure is provided into said brewing chamber and the brewing accessory in use is detected automatically so as to initiate a corresponding work mode according to desire.

16 Claims, 12 Drawing Sheets

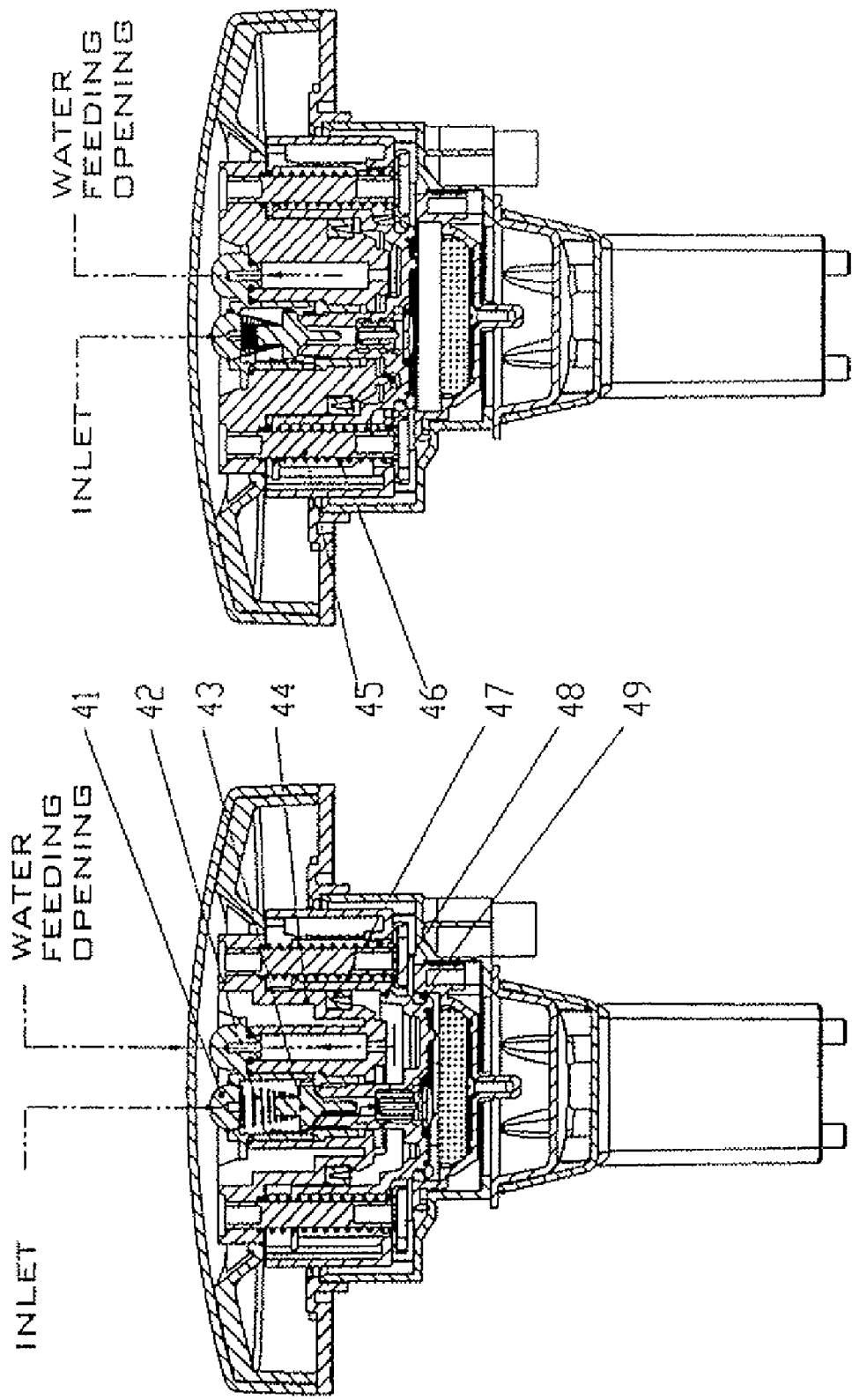

MULTI-FUNCTION COFFEE MAKER

CROSS-REFERENCE

The present application is a continuation-in-part application based on U.S. patent application Ser. No. 10/843,179 that had been filed on May 11, 2004.

TECHNICAL FIELD

This invention relates to a multi-function coffee maker, which can be used to make espresso coffee or drip coffee or tea in the same machine.

BACKGROUND OF THE INVENTION

Brewing drip coffee requires 0-2.5 bar water, while brewing espresso coffee requires 8-10 bar water. The brewing requirement for tea is similar to that for drip coffee. The existing coffee machine such as a coffee maker or a coffee center can be used to make either drip coffee or espresso coffee, but can not be used to make both of drip coffee and espresso coffee in the same machine.

SUMMARY OF THE INVENTION

The main object of the present invention is to provide a multi-function coffee maker which can be used to make espresso coffee or drip coffee or tea in the same machine.

The multi-function coffee maker according to the present invention comprises: a casing, a cover assembly with a brewing room inside, a water reservoir, a water pump, an electric heater, a water distributor assembly, a control valve assembly, a base assembly, a control circuit and brewing accessories, wherein said brewing accessories at least include an espresso coffee brewing accessory and a drip coffee brewing accessory, which are interchangeable and each can be loaded within said brewing room of said cover assembly to form an individual brewing chamber; wherein said water reservoir assembly, water pump, water distributor assembly, control valve assembly and brewing chamber construct a water loop of said coffee maker, water flow of different pressures may be generated within said water loop; and wherein said control circuit comprises a control chip, and connected with said control chip are a sampling circuit for thermal sensors, a control circuit for the pump, a control circuit for the heater and a detection circuit for the brewing accessory, and wherein brewing control program is set within said control chip, said brewing control program contains working modes including at least espresso coffee brewing mode and drip coffee brewing mode; by said water distributor assembly and said control circuit, water flow of suitable pressure is provided into said brewing chamber and the brewing accessory in use is detected automatically so as to initiate a corresponding work mode according to desire.

Preferably, said brewing accessories further include a tea brewing accessory, and said brewing control program within said control chip further contains a tea brewing mode.

Preferably, said detection circuit for the brewing accessory includes a plurality of proximity switch assemblies, each proximity switch assembly includes a magnetic element installed on one of said brewing accessories and a magnetic field sensor installed on said brewing room, so that, when said brewing accessory is loaded into said brewing room, said control chip will obtain a signal to detect and distinguish the brewing accessory in use.

Preferably, two kinds of water flow of different pressures can be generated within said water loop, one kind of water flow is of 0-2.5 BAR for brewing drip coffee or tea, the other kind of water flow is of 8-10 BAR for brewing espresso coffee.

With the above mentioned technical scheme adopted, drip coffee, or espresso coffee, hot tea or ice tea may be brewed in the same coffee machine by using different kinds of brewing accessories, coffee capsules, coffee pods, coffee powder or tea pods. The present invention is a significant innovation to the mono-function coffee makers existing in the market.

BRIEF DESCRIPTION OF THE DRAWINGS

FIG. 7c is a sectional view of FIG. 7a or FIG. 7b along K-K line;

FIG. 7d is a sectional view of FIG. 7a or FIG. 7b along K-K line with the piston in the compression position;

DETAILED DESCRIPTION OF THE PREFERRED EMBODIMENTS

The present invention will be described in details in combination with the accompanying drawings and embodiments.

Figure 1:
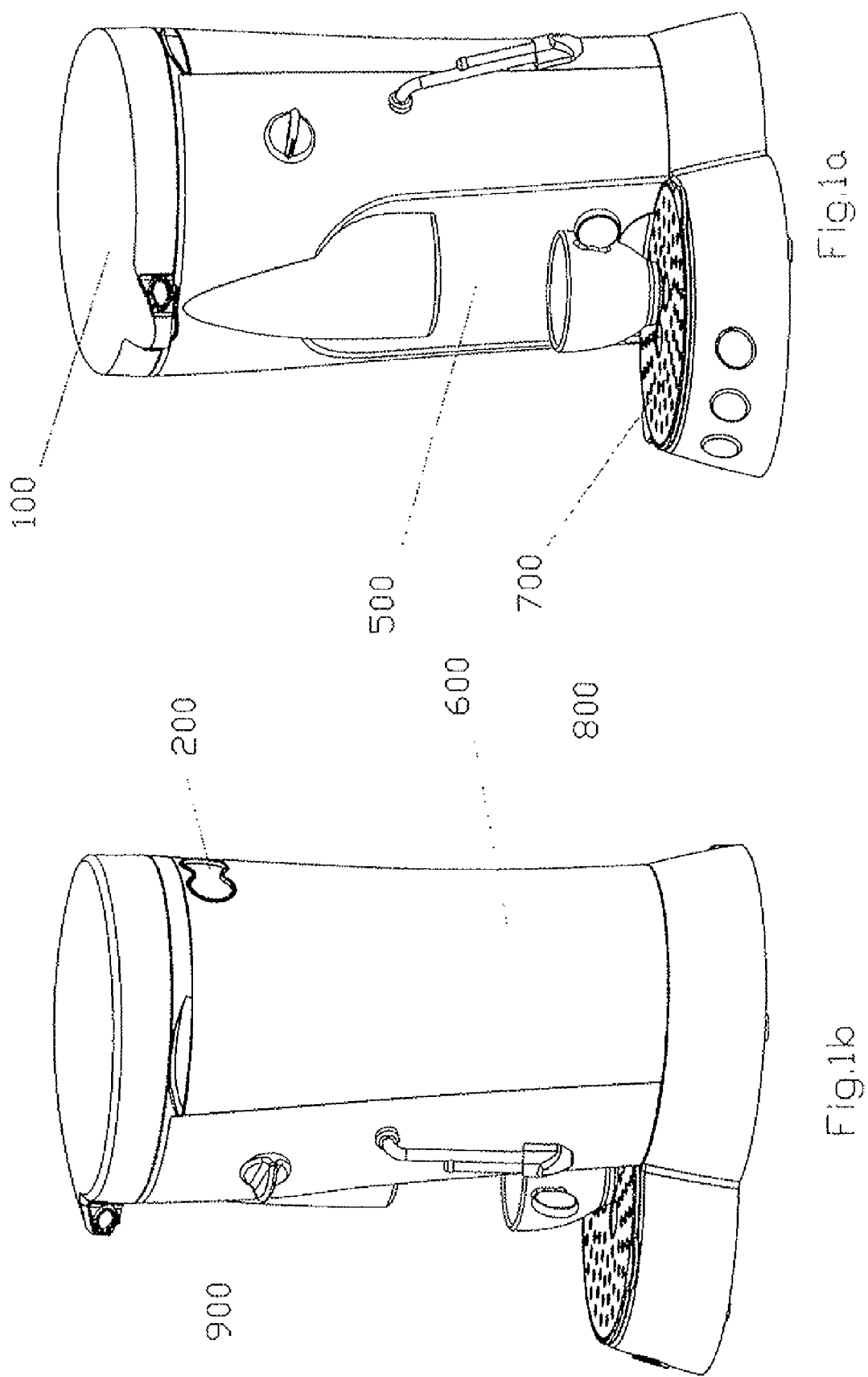
FIG. 1a is a front perspective view of the multi-function coffee maker according to the present invention.
FIG. 1b is a back perspective view of the multi-function coffee maker according to the present invention.

As shown in FIG. 1a and 1b, the coffee maker according to the present invention comprises a casing 500, a cover assembly 100 with a brewing room inside, a water reservoir 600 having a water injection 200 at the back, a water pump, an electric heater, a water distributor assembly 900, a control valve assembly, a base assembly 800 and a drip tray 700.

Said coffee maker further comprises more than one brewing accessory, which may be either an espresso coffee brewing accessory, a drip coffee brewing accessory or a tea brewing accessory. Said brewing accessories are interchangeable and each can be loaded within said brewing room of said cover assembly to form an individual brewing chamber.

Figure 2:
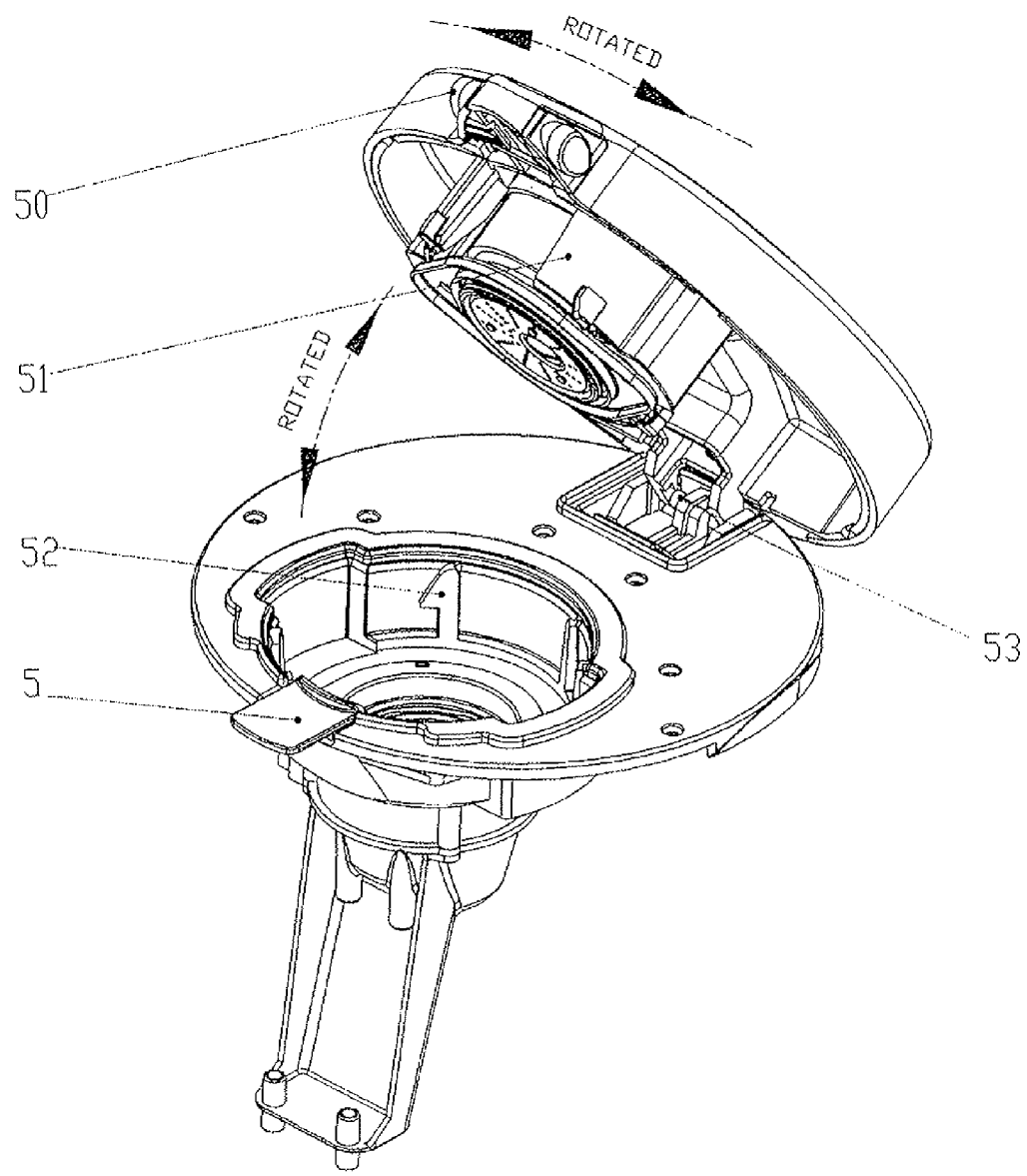
FIG. 2 is a schematic view showing the open-close mechanism of the cover assembly of the multi-function coffee maker according to the present invention.

As shown in FIG. 2, said cover assembly 100 is constructed by an upper cover and a lower chamber joined together by an open-closed mechanism. Said open-close mechanism includes a rotary knob 50, a latch 51, a lock seat 52 and a hinge axle 53. By rotating the rotary knob 50, the latch 51 leaves away the lock seat 52. By rotating the upper cover around the hinge axle 53, the cover assembly 100 is opened, and the brewing room inside is exposed. Load the brewing accessory inside the brewing room and onto a small pot seat 5, close the cover assembly 100, then the latch 51 returns to the lock seat 52 automatically under the effect of the spring force, thus the brewing chamber is formed.

Said brewing room may be fixed or replaceable, which can accommodate coffee capsules of various shapes or specifications, coffee pods of various shapes or specifications, coffee powder of various amount or specifications, or tea pods of various shapes or specifications.

Said coffee pods or coffee capsules may be used to brew drip coffee or espresso coffee.

Said coffee powder may be used to brew drip coffee or espresso coffee.

Said tea pods may be used to brew hot tea or ice tea.

Said water reservoir assembly 600, water pump, water distributor assembly 900, control valve assembly and brewing chamber construct the water loop of said coffee maker, and water flow of different pressures may be generated within said water loop. Thereby, water flow of suitable pressure is provided into said brewing chamber according to the brewing requirements.

Preferably, two kinds of water flow of different pressures can be generated within said water loop, one kind of water flow is of 0-2.5 BAR for brewing drip coffee or tea, the other kind of water flow is of 8-10 BAR for brewing espresso coffee.

Figure 3A:
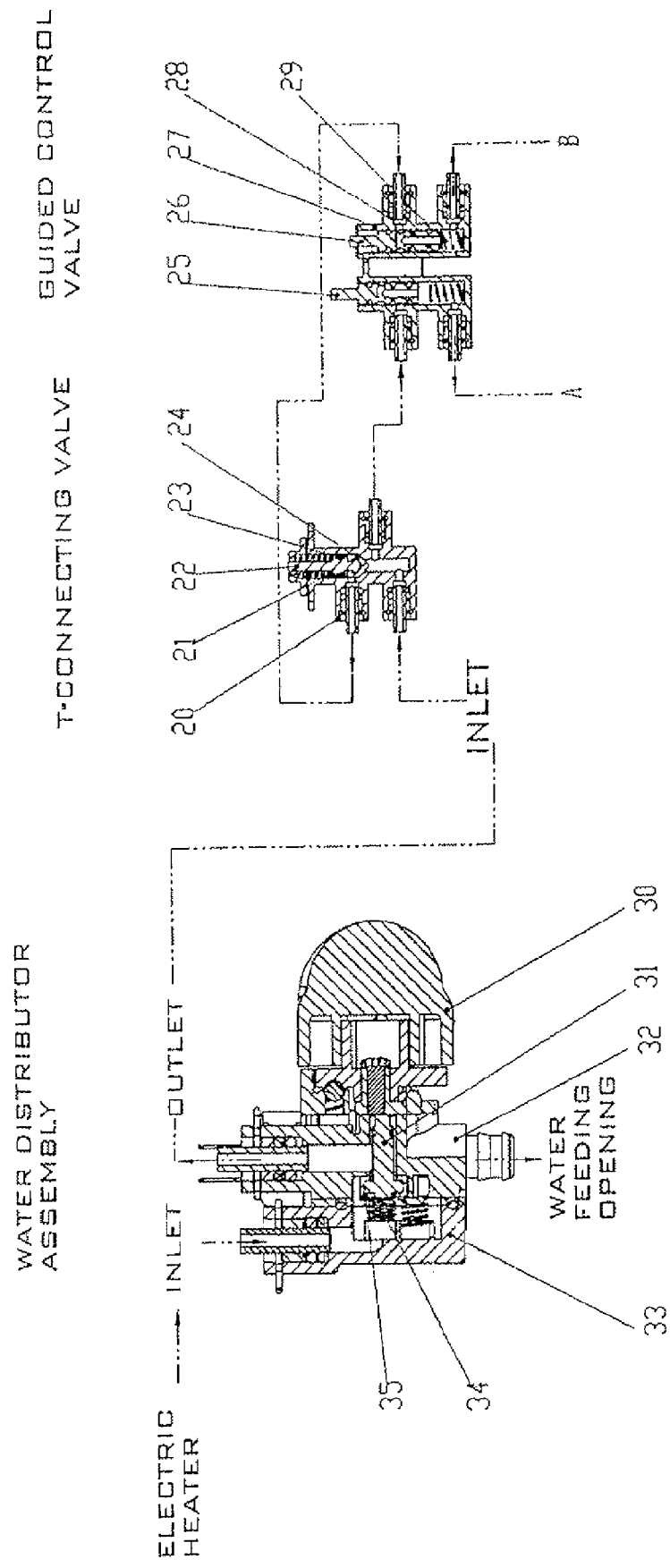
FIG. 3a is a schematic view showing the working principle when the water distributor assembly is working in combination with the control valve assembly.

FIG. 3a is a schematic view showing the working principle when the water distributor assembly is working in combination with the control valve assembly. It is suitable for brewing coffee with coffee capsules.

Said control valve assembly is constructed by a T-connecting valve and a guided control valve. With said T-connecting valve, only one water pump is used for two water loops of different pressures. Said water loops of two different pressures are opened respectively to the brewing chamber loaded with either drip coffee brewing accessory, or espresso coffee brewing accessory or tea brewing accessory. Thereby, two different kinds of working modes are provided.

Alternatively, separate pumps may be used in the water loop.

The T-connecting valve comprises a valve body 20, a relief spring 21, a valve shaft 22 and a rubber plug 24, wherein the relief spring 21 is mounted on the valve shaft 22, the O-shaped ring 23 is installed above the rubber plug 24, so as to form a relief valve.

In said guided control valve, an espresso coffee control lever 25 and a drip coffee control lever 26 are installed in parallel in a guided control valve body 27. An O-shaped ring 28 and a reset spring 29 are installed under both of the espresso coffee control lever 25 and the drip coffee control lever 26.

When the espresso coffee brewing accessory is loaded, the espresso coffee control lever 25 is pushed down, the drip coffee control lever 26 remains at the original position, i.e., channel A is opened, channel B is closed. Rotate the control knob 30 to a certain working mode to actuate the pump, the water heated by the electric heater enters the T-connecting valve, then the guided control valve, and finally outflows through channel A, thus, 6-10 BAR is obtained inside the brewing chamber for brewing espresso coffee. When the drip coffee brewing accessory is loaded, the drip coffee control lever 26 is pushed down, the espresso coffee control lever 25 remains at the original position under the effect of the reset spring 28, i.e., channel A is closed, channel B is opened. To overcome the elastic force of the relief spring 21 of the T-connecting valve, the water pressure in the loop is reduced by 6-8 BAR. Water flow entering the guided control valve outflows through channel B, thus, 0-2.5 BAR is obtained inside the brewing chamber for brewing drip coffee or tea.

Said water distributor assembly 900 consists of a control knob 30, a water distributor 33, a distributor cover 32, a distributor lever 31, a sealed ring 35, a reset spring 34, etc. By rotating the control knob 30 to compress or release the distributor lever 31, water loop is connected or disconnected, thus, the water loop with one inlet and two outlets is formed. The control principle is similar to that of said guided control valve.

Figure 3B:
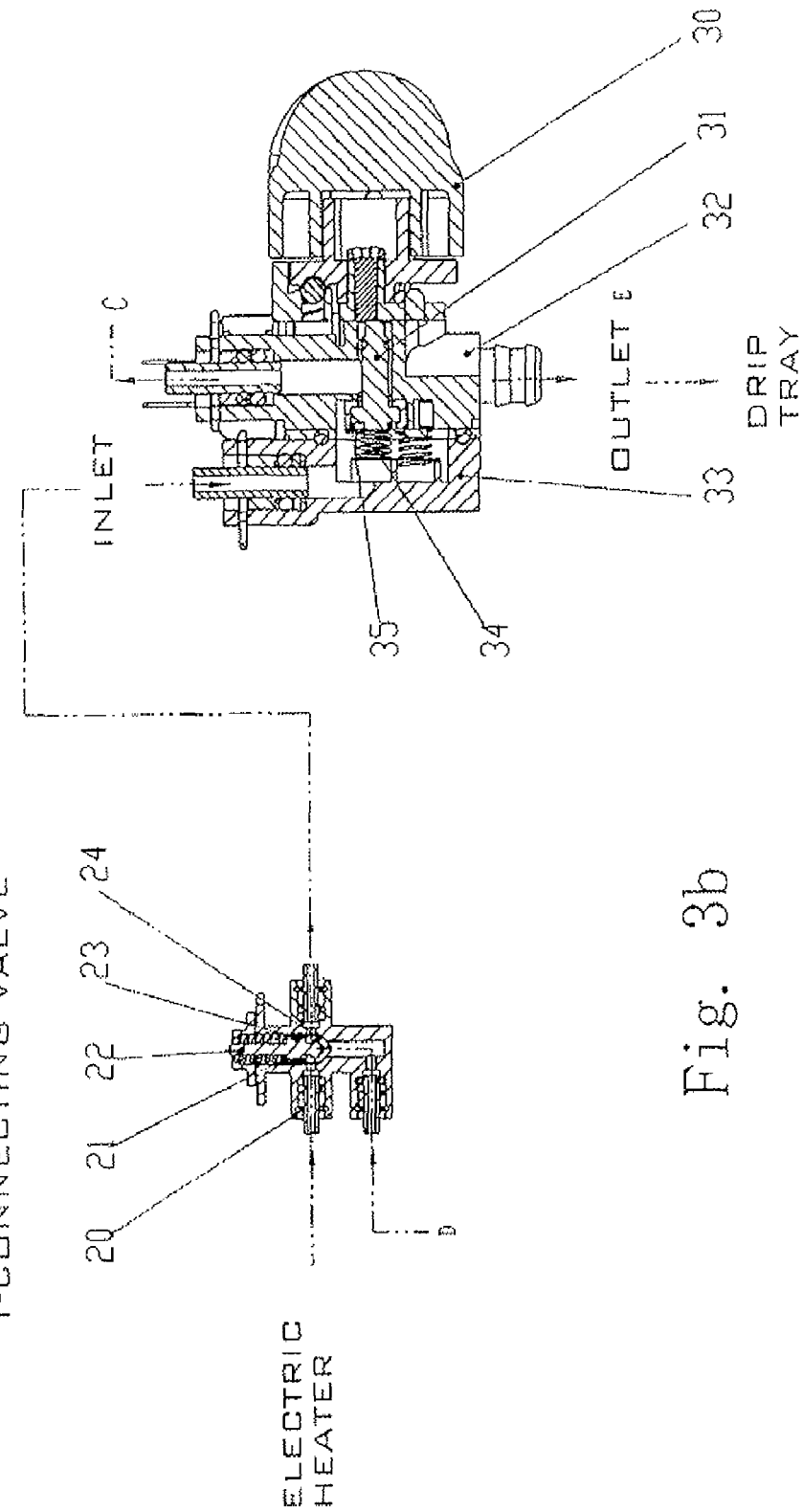
FIG. 3b is a schematic view showing the working principle when the water distributor assembly and the control valve assembly are working separately.

FIG. 3b is a schematic view showing the working principle when the water distributor assembly and the control valve assembly are working separately. It is suitable for brewing coffee or tea with coffee pods, coffee powder, or tea pods.

By rotating the control knob 30 to a certain working mode to open channel C and simultaneously actuate the pump, water heated by the electric heater enters the T-connecting valve, then the water distributor, finally outflows through channel C to enter the brewing chamber. After brewing, by rotating the control knob 30 to a certain working mode to open channel E, water from the brewing chamber enters the T-connecting valve through the water-feeding opening D. Water flow through the water-feeding opening D opens the relief valve, enters the water distributor, then outflows through channel E, and is collected by the drip tray.

Figures 4A, 4B:
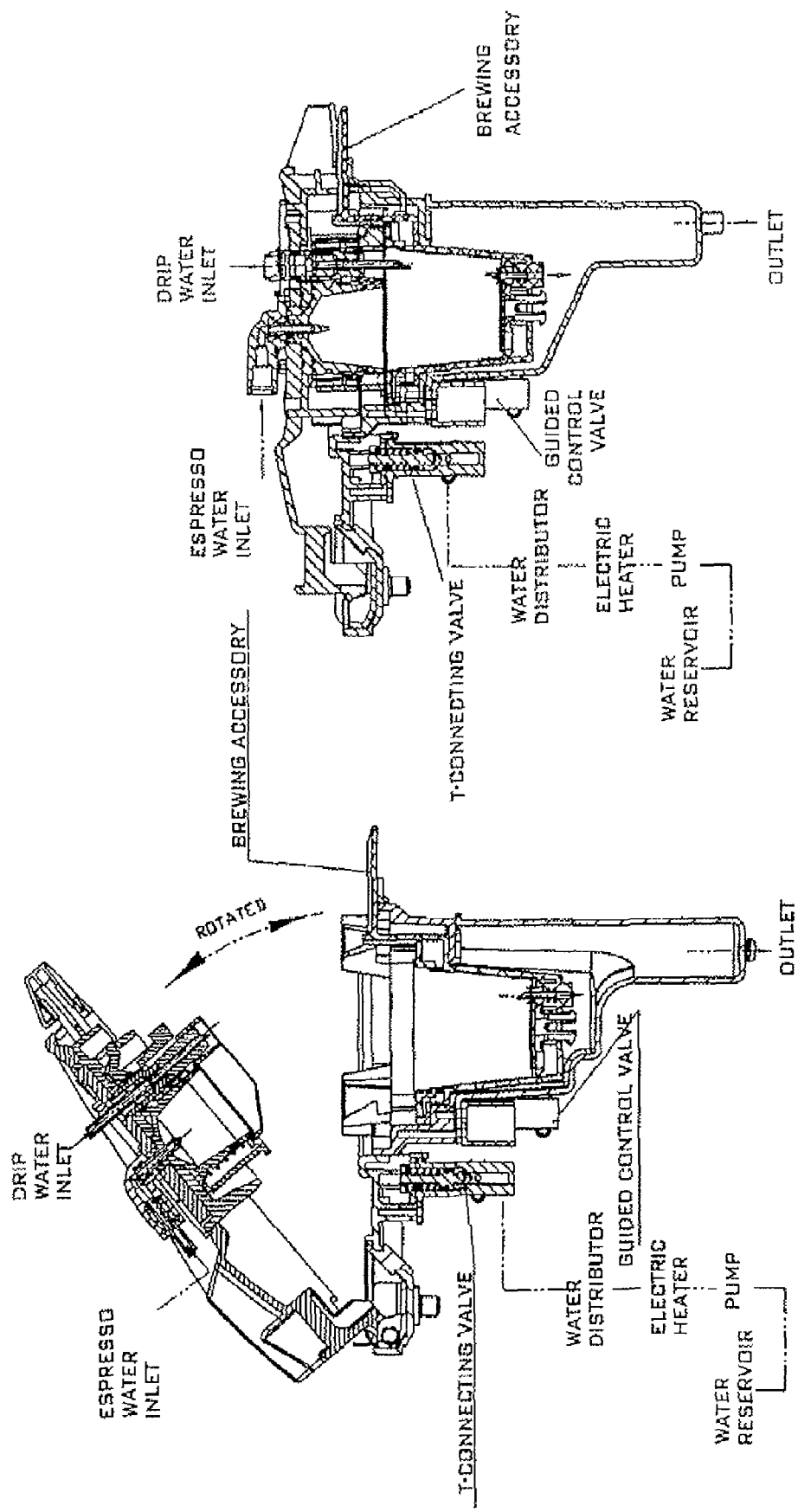
FIG. 4a is a schematic view showing the brewing room suitable for accommodating coffee capsules with the cover assembly closed.
FIG. 4b is a schematic view showing the brewing room suitable for accommodating coffee capsules with the cover assembly opened.

Said water distributor assembly and control valve assembly can be used in combination or separately. When they are working in combination, three kinds of working modes can be provided such as close, low pressure and high pressure. When they are working separately, in combination with the brewing accessory and the pressure hold valve, two kinds of working modes can be provided such as low pressure and high pressure As shown in FIG. 4a and 4b, the brewing room is suitable for accommodating the coffee capsule. Said brewing room includes a drip water inlet and an espresso water inlet. Water from the water reservoir is pumped by the pump, heated by the electric heater, then distributed by the T-connecting valve, the guided controlled valve and the water distributor, finally enters the brewing room through drip water inlet or espresso water inlet for brewing coffee.

Figure 5:
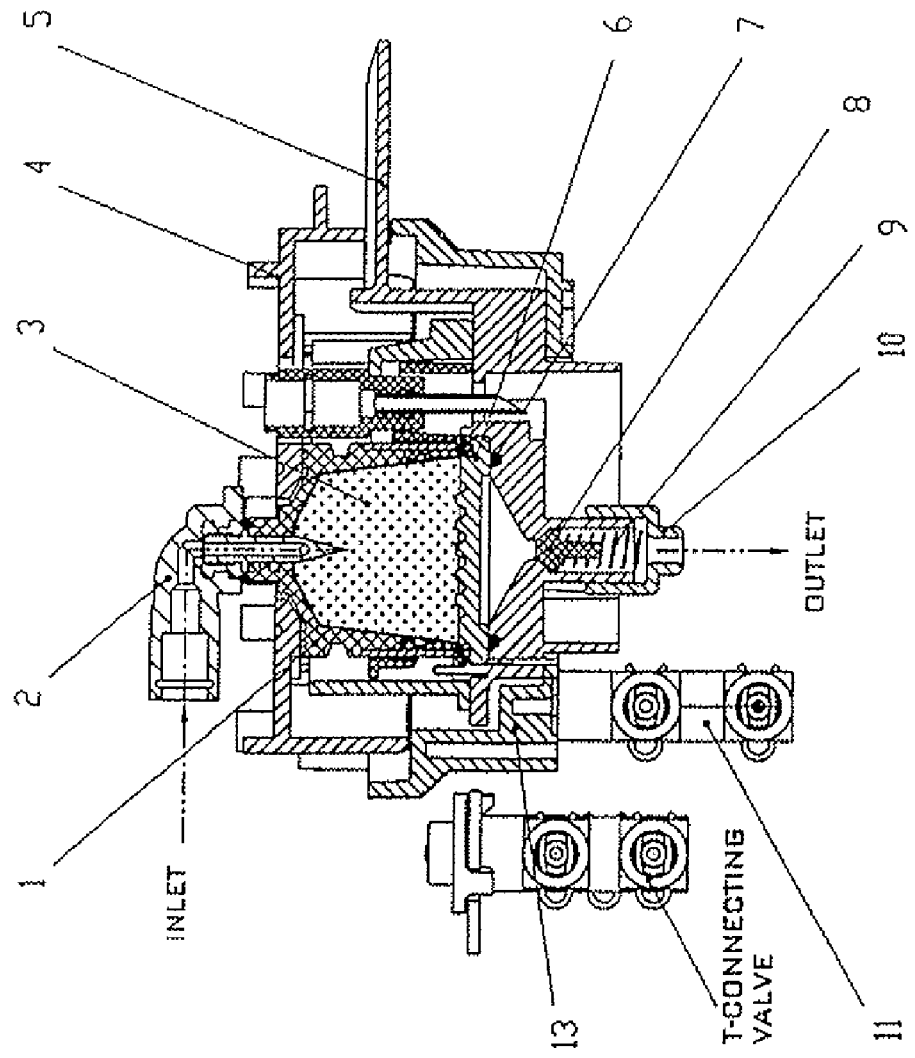
FIG. 5 is a schematic view of the brewing chamber with an espresso coffee capsule loaded according to the present invention.

As shown in FIG. 5, an espresso coffee brewing accessory is loaded which includes an espresso coffee capsule 3 connected with the espresso water inlet 2, a filter plate 6 installed under the coffee capsule 3, a small pod cover 1 and a pressure limiting check valve consisting of a small pod seat 5, a discharge plug 8 with a spring 9 thereon and a discharge plug cover 10. Said water discharge plug 8 is installed under said filter plate 6, said plug cover 10 is installed at the water outlet, and a small pod sealing ring 7 is installed at the contact point between said filter plate 6 and said small pod seat 5. The guided control valve 11 is installed under the lower brewing chamber 13, and the small pod cover 1 is installed under the upper brewing chamber 4.

After the upper brewing chamber 4 is locked, the drip coffee control lever 25 is pressed down by the small pod seat 5. Then, channel A is opened by the guided control valve and channel B is closed. By rotating the control knob 30 to a certain working mode to actuate the pump, water heated by the electric heater enters the brewing chamber via the espresso water inlet and espresso coffee is made. Said pressure limiting check valve keeps the pressure within the brewing chamber at the range of 8-10 BAR when brewing espresso coffee.

Figure 6:
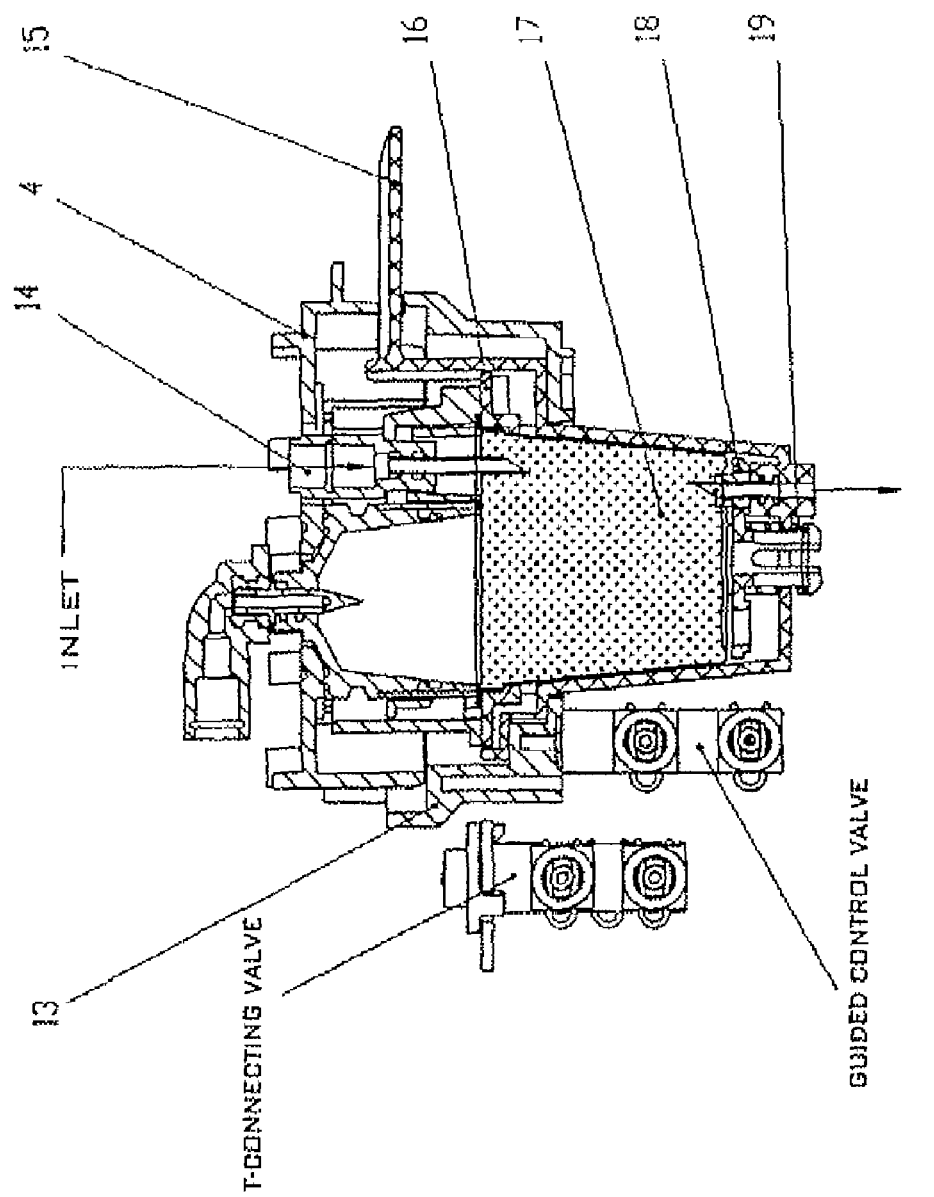
FIG. 6 is a schematic view of the brewing chamber with a drip coffee capsule loaded according to the present invention.

As shown in FIG. 6, a drip coffee brewing accessory is loaded which includes a drip coffee capsule 17 connected with the drip coffee inlet 14, a big pod seat 15 installed under the upper brewing chamber 4, a big pod intermediate seat 16 installed under said big pod seat 15, a big pod elastic compression seat 18 under said drip coffee capsule 17, and a big pod spring 19 installed at the bottom of said big pod elastic compression seat 18.

After the upper brewing chamber 4 is locked, the drip coffee control lever 26 is pressed down by the big pod seat 15. Then, channel B is opened by the guided control valve and channel A is closed. By rotating the control knob 30 to a certain working mode to actuate the pump, water heated by the electric heater enters the brewing chamber via the drip water inlet and drip coffee is made.

FIG. 7a, 7b, 7c and 7d show the brewing room suitable for accommodating a coffee pod or coffee powder or a tea pod. Said brewing room includes a water inlet 40, a piston 48, a water inlet plug 43 installed under said water inlet 40 and within the inner hole of said piston 48, a relief spring 42 around and supporting the water inlet plug 43, a guided shaft 45 with a guided shaft spring 46 mounted thereon, and a V-ring 47 mounted on said piston 48; said piston 48 can move up and down by compressing said guided shaft spring 46 along said guided shaft 45. Water from the pump is heated by the electric heater, and distributed by the water distributor and the T-connecting valve, finally, enters the brewing chamber via the water inlet 40 for brewing coffee.

A pressure hold valve 39 is also provided, when it is mounted, the pressure inside the brewing chamber is maintained at 8-10 BAR, which is suitable for brewing espresso coffee. When it is not mounted, the pressure inside the brewing chamber is at 0-2.5 BAR, which is suitable for brewing drip coffee or tea.

Figure 7A:
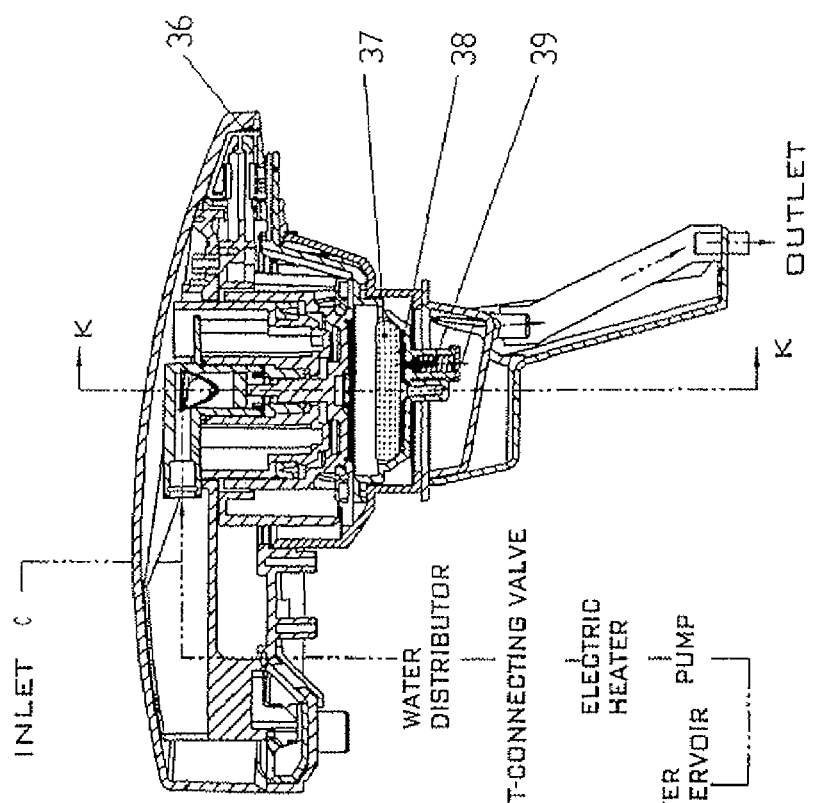
FIG. 7a is a schematic view of the brewing chamber with an espresso coffee pod or espresso coffee powder loaded according to the present invention.

FIG. 7a, 7c, 7d show an espresso coffee brewing accessory loaded in the brewing chamber, which includes an accessory seat 36, espresso coffee pod or espresso coffee powder 37, filter plate 38 and pressure hold valve 39.

Figure 7B:
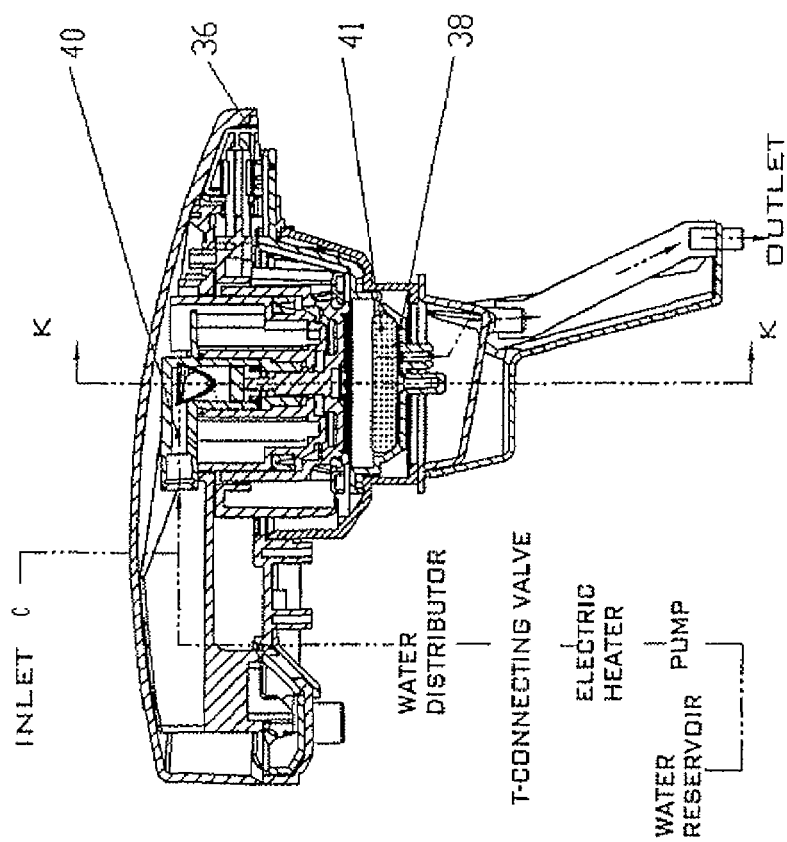
FIG. 7b is a schematic view of the brewing chamber with a drip coffee pod, drip coffee powder or a tea pod loaded according to the present invention.

FIG. 7b, 7c, 7d show a drip coffee brewing accessory loaded in the brewing chamber, which includes a filter plate 38, drip coffee pod or drip coffee powder 41.

Figure 8:
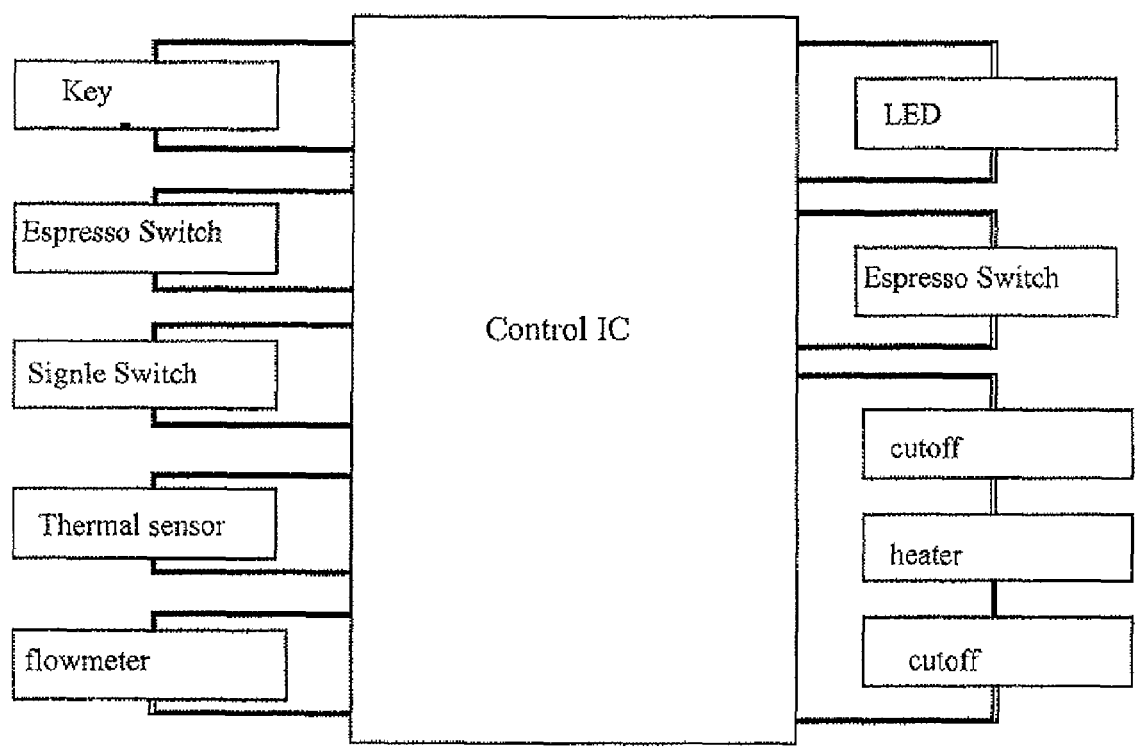
FIG. 8 is a block diagram of the control circuit of the multi-function coffee maker as shown in FIG. 1.

FIG. 8 is a block diagram of the control circuit of the present multi-coffee maker, which comprises a control chip IC, and connected with the control chip IC are a LED display circuit, a button input circuit, a sampling circuit for thermal sensors, a control circuit for the pump, a control circuit for the heater, a control circuit for a flowmeter and a detection circuit for the brewing accessory. The detection circuit for brewing accessory includes an Espresso switch and a signle switch. A brewing control program is set within the control chip, the brewing control program contains different working modes for brewing espresso coffee, drip coffee and tea respectively.

The detection circuit for the brewing accessory includes three proximity switch assemblies, each proximity switch assembly includes a magnetic element installed on one of said brewing accessories and a magnetic field sensor installed on said brewing room.

Figures 9A, 9B, 9C:
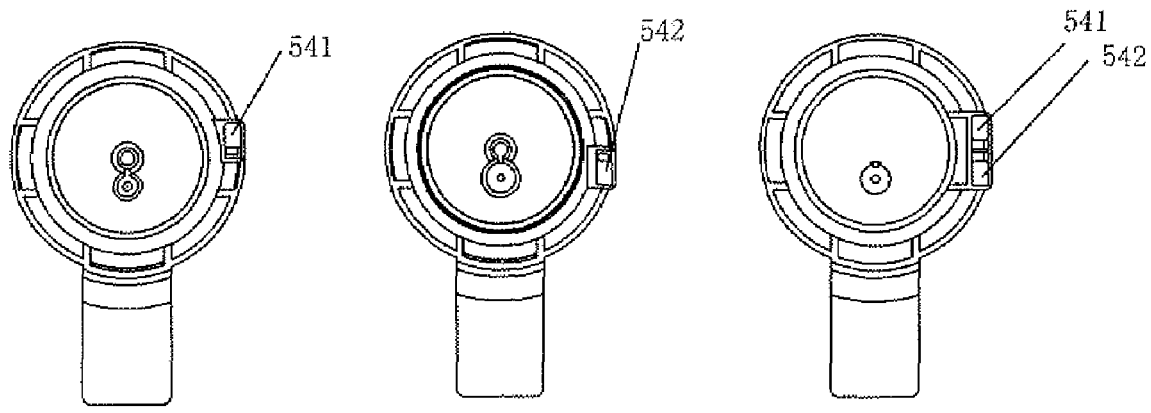
FIG. 9a is a schematic view showing the magnetic element installed on a drip coffee brewing accessory.
FIG. 9b is a schematic view showing the magnetic element installed on an espresso coffee brewing accessory.
FIG. 9c is a schematic view showing the magnetic element installed on a tea brewing accessory.

As shown in FIG. 9a, a magnet 541 is installed on a drip coffee brewing accessory. As shown in FIG. 9b, a magnet 542 is installed on an espresso coffee brewing accessory. While as shown in FIG. 9c, both of a magnet 541 and a magnet 542 are installed on a tea brewing accessory.

Correspondingly, two magnetic field sensors 55 are installed on the lower brewing chamber 13. Alternatively, the two magnetic field sensors 55 may be installed on the lock seat 52.

Figure 10A:
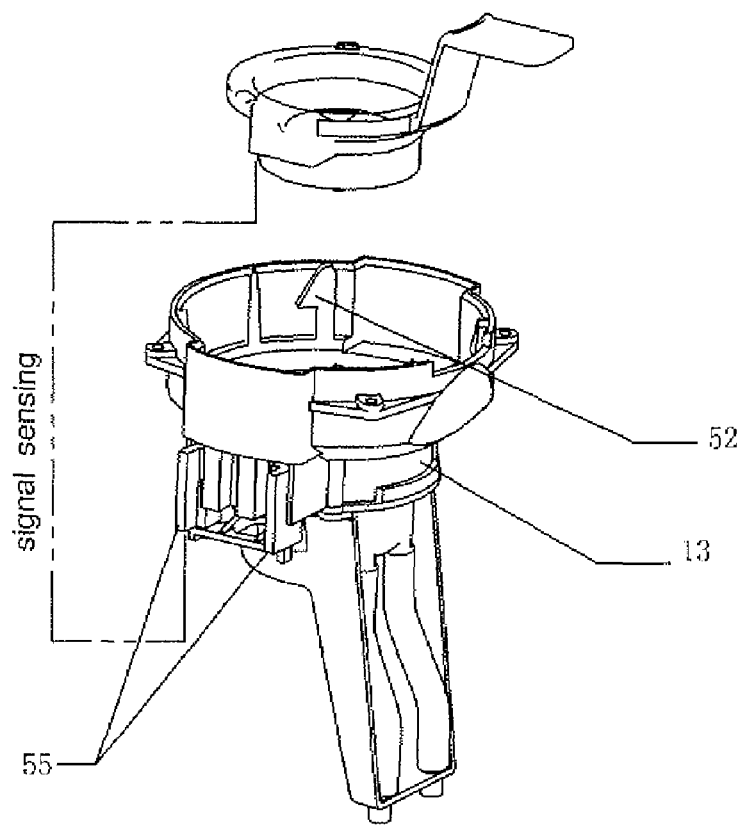
FIG. 10a is a schematic view showing signal sensing between the magnetic element installed on a drip coffee brewing accessory as shown in FIG. 9a and the magnetic field sensor installed on the brewing room.
Figure 10B:
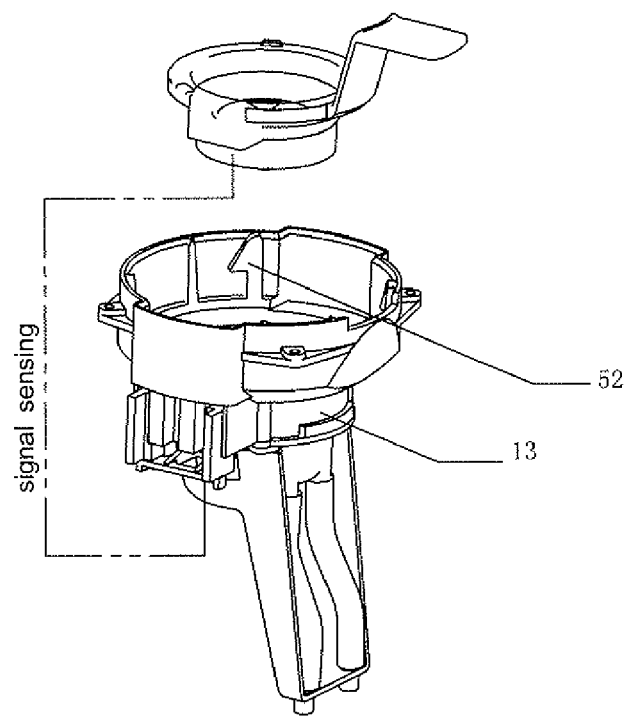
FIG. 10b is a schematic view showing signal sensing between the magnetic element installed on an espresso coffee brewing accessory as shown in FIG. 9b and the magnetic field sensor installed on the brewing room.
Figure 10C:
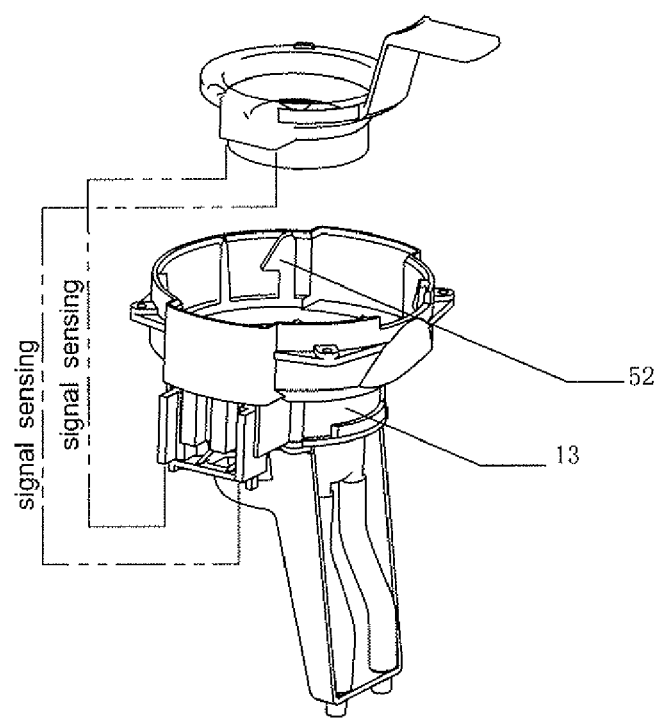
FIG. 10c is a schematic view showing signal sensing between the magnetic element installed on a tea brewing accessory as shown in FIG. 9c and the magnetic field sensor installed on the brewing room.

When a brewing accessory with a magnetic element is loaded into said brewing room, the magnetic field sensor will generate a specific sensing signal, and transfer the signal to the control chip. FIG. 10a is a schematic view showing signal sensing between the magnetic element installed on a drip coffee brewing accessory as shown in FIG. 9a and the magnetic field sensor installed on the brewing room. In this case, the Espresso switch is not connected, while the signle switch is connected, and the control chip initiates the working mode for brewing drip coffee. FIG. 10b is a schematic view showing signal sensing between the magnetic element installed on an espresso coffee brewing accessory as shown in FIG. 9b and the magnetic field sensor installed on the brewing room. In this case, the Espresso switch is connected, while the signle switch is not connected, and the control chip initiates the working mode for brewing espresso coffee. FIG. 10c is a schematic view showing signal sensing between the magnetic element installed on a tea brewing accessory as shown in FIG. 9c and the magnetic field sensor installed on the brewing room. In this case, both of the Espresso switch and the signle switch are connected, and the control chip initiates the working mode for brewing tea.

After loading the brewing accessory, close the cover assembly 100, rotate the control knob 30 to open channel C and actuate the pump. Water from the water reservoir 600 enters the T-connecting valve through the pump, and outflows through channel C of the water distributor 900. Then, water enters the piston 48 from the periphery of the water inlet plug 43 via the water inlet 40. The piston 48 moves downwards to the brewing accessory by compressing the guided shaft spring 46 along the guided shaft 45, and thus, with the aid of an O-shaped ring 49, a tightly sealed brewing chamber is formed. When the piston 48 reaches the compression position, the inlet plug 43 is blocked by the piston head 44 and will not move downwards along with the piston 48. Then, the inlet plug 43 and the piston 48 is no longer in the sealing status, water enters the brewing accessory through the inner hole of the piston 48, and thus, the espresso coffee, drip coffee or tea is made. The control circuit automatically detects and distinguishes which kind of brewing accessory is in use, so as to initiate an appropriate working mode for brewing drip coffee, espresso coffee and tea. After brewing, rotate the control knob 30 to shut off the pump, to open channel E and the relief water loop. The piston 48 moves upwards along the guided shaft 45 under the effect of the spring 46, then the water plug 43 and the piston 48 are in the sealing status, the water within the piston 48 is forced to return to the T-connecting valve along the water-feeding opening D, enters the water distributor 900 via the water discharge channel E, and outflows into the drip tray. After that, the cover assembly 100 can be opened, the brewing accessory can be taken out, and thus the brewing is completed.

Said water reservoir assembly 600 may be replaceable or fixed. A water injection port 200 is installed at the back of the water reservoir, which may be used as a handle as well. Cold water may be filled by opening the water reservoir cover, or through the water injection port without opening the water reservoir cover.

Said drip tray assembly 700 is located below the brewed coffee outlet and is detachably connected with the base assembly 800, so as to be easy for detachment and clean.

What is claimed is:

1. A multi-function coffee maker, comprising:
a casing, a cover assembly with a brewing room inside, a water reservoir, a water pump, an electric heater, a water distributor assembly, a control valve assembly, a base assembly, a control circuit and brewing accessories;
wherein said brewing accessories at least include an espresso coffee brewing accessory and a drip coffee brewing accessory, which are interchangeable and each can be loaded within said brewing room of said cover assembly to form an individual brewing chamber;
wherein said water reservoir, water pump, water distributor assembly, control valve assembly and brewing chamber construct a water loop of said coffee maker, two kinds of water flow of different pressures may be generated within said water loop, one kind of water flow is of 0-2.5 BAR for brewing drip coffee, the other kind of water flow is of 8-10 BAR for brewing espresso coffee;
wherein said control circuit comprises a control chip, and connected with said control chip are a sampling circuit for thermal sensors, a control circuit for said water pump, a control circuit for said electric heater and a detection circuit for the brewing accessory;
wherein said detection circuit for the brewing accessory includes a plurality of proximity switch assemblies, each proximity switch assembly includes a magnetic element installed on one of said brewing accessories and a magnetic field sensor installed on said brewing room, so that, when said brewing accessory is loaded into said brewing room, said control chip will obtain a signal to detect and distinguish the brewing accessory in use; and
wherein brewing control program is set within said control chip, said brewing control program contains working modes including at least espresso coffee brewing mode and drip coffee brewing mode; by said water distributor assembly and said control circuit, water flow of suitable pressure is provided into said brewing chamber and the brewing accessory in use is detected automatically so as to initiate a corresponding work mode.

2. A multi-function coffee maker according to claim 1, wherein said brewing accessories further include a tea brewing accessory, and said brewing control program within said control chip further contains a tea brewing mode, said water flow of 0-2.5 BAR is also for brewing tea.

3. A multi-function coffee maker according to claim 1, wherein said cover assembly is constructed by an upper cover and a lower chamber joined together by an open-closed mechanism; and when the cover assembly is opened, the brewing room inside is exposed.

4. A multi-function coffee maker according to claim 1, wherein said brewing room may be fixed or replaceable, which can accommodate coffee capsules of various shapes or specifications, coffee pods of various shapes or specifications, coffee powder of various amount or specifications, or tea pods of various shapes or specifications.

5. A multi-function coffee maker according to claim 1, wherein the water distributor assembly is working in combination with the control valve assembly; and wherein said control valve assembly is constructed by a T-connecting valve and a guided control valve; with said T-connecting valve, only one water pump is used for two water loops of different pressures.

6. A multi-function coffee maker according to claim 5, wherein said T-connecting valve comprises a valve body, a relief spring, a valve shaft and a rubber plug, and wherein the relief spring is mounted on the valve shaft, the O-shaped ring is installed above the rubber plug, so as to form a relief valve.

7. A multi-function coffee maker according to claim 5, wherein said brewing room includes a drip water inlet and an espresso water inlet; water from the water reservoir is pumped by the pump, heated by the electric heater, then distributed by the T-connecting valve, guided controlled valve and the water distributor, finally enters the brewing room through drip water inlet or espresso water inlet for brewing coffee.

8. A multi-function coffee maker according to claim 5, wherein, in said guided control valve, espresso coffee control lever and drip coffee control lever are installed in parallel in the guided control valve body; when the espresso coffee brewing accessory is loaded and the upper brewing chamber is locked, the drip coffee control lever is pressed down, channel A is opened by the guided control valve and channel B is closed; when the drip coffee brewing accessory is loaded and the upper brewing chamber is locked, the espresso coffee control lever is pressed down, channel B is opened by the guided control valve and channel A is closed.

9. A multi-function coffee maker according to claim 8, wherein an O-shaped ring and a reset spring are installed under both of the espresso coffee control lever and the drip coffee control lever.

10. A multi-function coffee maker according to claim 7, wherein an espresso coffee brewing accessory is loaded within said brewing room which includes an espresso coffee capsule connected with the espresso water inlet, a filter plate installed under the coffee capsule, a small pod cover and a pressure limiting check valve.

11. A multi-function coffee maker according to claim 7, wherein a drip coffee brewing accessory is loaded within said brewing room which includes a drip coffee capsule connected with the drip coffee inlet, a big pod seat, a big pod intermediate seat installed under said big pod seat, a big pod elastic compression seat under said drip coffee capsule, and a big pod spring installed at the bottom of said big pod elastic compression seat.

12. A multi-function coffee maker according to claim 1, wherein said water distributor assembly and the control valve assembly are working separately; said control valve assembly is constructed by a T-connecting valve.

13. A multi-function coffee maker according to claim 12, wherein said brewing room further includes a pressure hold valve, when it is mounted, the pressure inside the brewing chamber is maintained at 8-10 BAR; when it is not mounted, the pressure inside the brewing chamber is at 0-2.5 BAR.

14. A multi-function coffee maker according to claim 1, wherein, a water injection port is installed at the back of the water reservoir, which may be used as a handle as well.

15. A multi-function coffee maker according to claim 1, wherein the drip coffee brewing accessory has one magnet installed thereon, and the espresso coffee brewing accessory has one magnet installed thereon.

16. A multi-function coffee maker according to claim 2, wherein the tea brewing accessory has two magnets installed thereon.

* * * * *